(12) United States Patent
Morris

(10) Patent No.: US 6,375,274 B1
(45) Date of Patent: Apr. 23, 2002

(54) PLASTIC WHEEL ASSEMBLY AND MOUNTING SLEEVE THEREFOR

(75) Inventor: Michael A. Morris, Menlo Park, CA (US)

(73) Assignee: GEO Plastics, Oakland, CA (US)

( * ) Notice: Subject to any disclaimer, the term of this patent is extended or adjusted under 35 U.S.C. 154(b) by 0 days.

(21) Appl. No.: 09/507,595

(22) Filed: Feb. 18, 2000

(51) Int. Cl.$^7$ ................................................ B60B 23/00
(52) U.S. Cl. ......................................... 301/111; 301/132
(58) Field of Search ................................ 301/111, 112, 301/118, 131, 132

(56) References Cited

U.S. PATENT DOCUMENTS

| | | | | |
|---|---|---|---|---|
| 486,023 A | * | 11/1892 | Bermel ........................ | 301/118 |
| 2,978,277 A | | 4/1961 | Gaudry ........................ | 301/111 |
| 3,907,370 A | | 9/1975 | Bard .......................... | 301/63 R |
| 5,215,356 A | * | 6/1993 | Lin ............................ | 301/111 |
| 5,222,786 A | | 6/1993 | Sovis et al. .................. | 301/111 |
| 5,277,480 A | * | 1/1994 | Chiu .......................... | 301/111 |
| 5,603,555 A | | 2/1997 | Dickey et al. ................ | 301/111 |
| 5,716,107 A | * | 2/1998 | Parker et al. ................ | 301/111 |
| 5,902,018 A | * | 5/1999 | Owen et al. .................. | 301/111 |
| 6,099,083 A | * | 8/2000 | Logan ......................... | 301/111 |

FOREIGN PATENT DOCUMENTS

EP          180307    * 5/1986    ................. 301/111

* cited by examiner

Primary Examiner—S. Joseph Morano
Assistant Examiner—Long Bao Nguyen
(74) Attorney, Agent, or Firm—Flehr Hohbach Test Albritton & Herbert LLP

(57) ABSTRACT

A plastic wheel (22) and wheel mounting sleeve (27, 27a, 27b, 27c) used to releasably secure the wheel (22) onto an axle (23). The wheel mounting sleeve (27) preferably includes two resilient, radially displaceable, axially extending, cantilevered fingers (46, 47) which are cantilevered from and extend axially in opposite directions on the sleeve (27). An axle-engaging shoulder (42) is provided on a radially inwardly extending lug (55) on one finger (46), while a wheel-engaging shoulder (43) is provided on a radially outwardly extending lug (61) on the other resilient finger (47). The respective shoulders (42, 43) cooperate with oppositely facing shoulders (58, 62) so as to releasably latch the sleeve (27) to the axle (23) and the wheel (22) to the sleeve (27). Assembly can be accomplished without any tools and a screwdriver can be used to disassemble the components. Alternative sleeves (27a, 27b, 27c) include an annular rib (101) which mates with an annular bore recess (102) to further limit relative movement between the sleeve (27a, 27b, 27c) and the wheel (22).

25 Claims, 10 Drawing Sheets

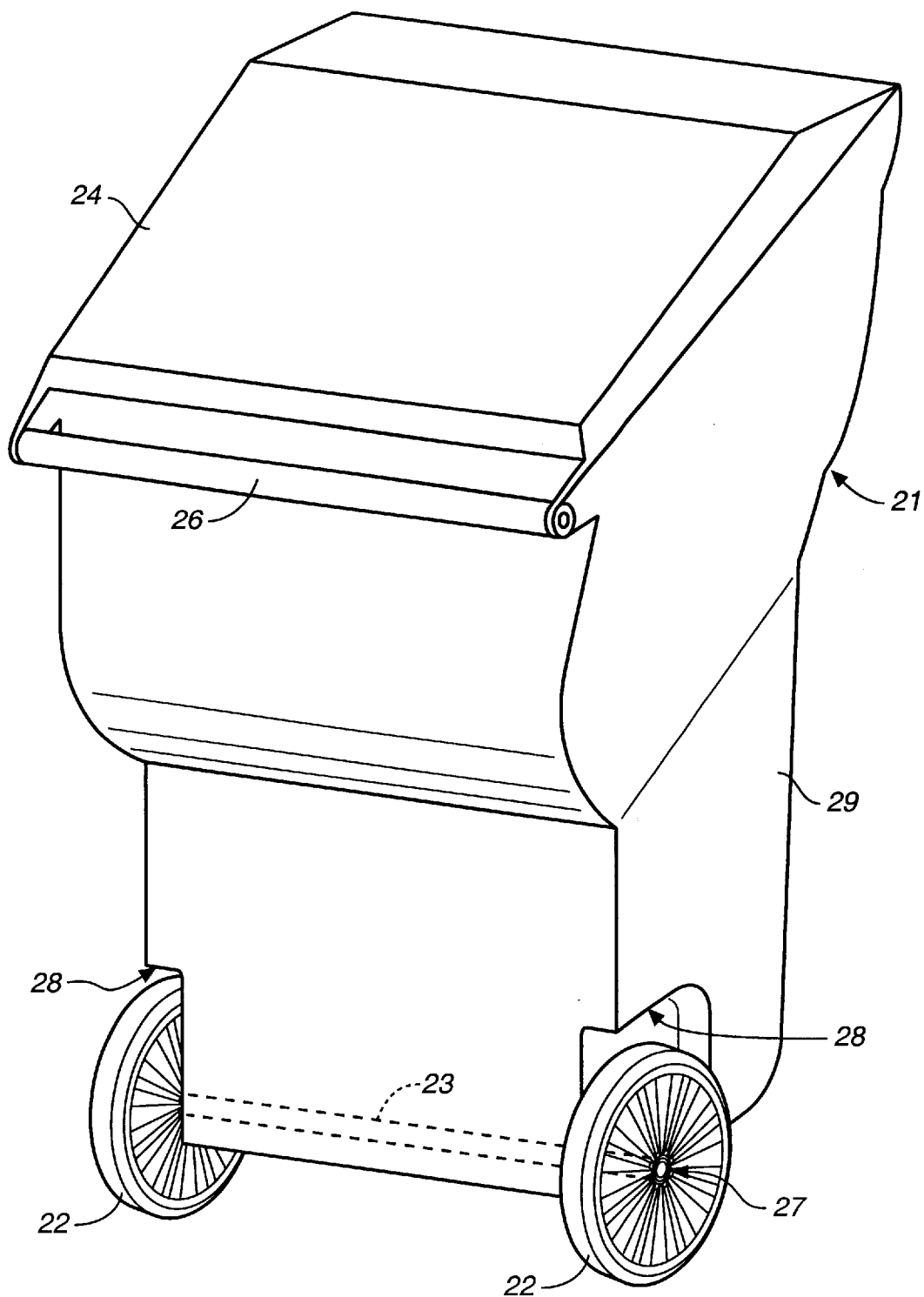
FIG._1

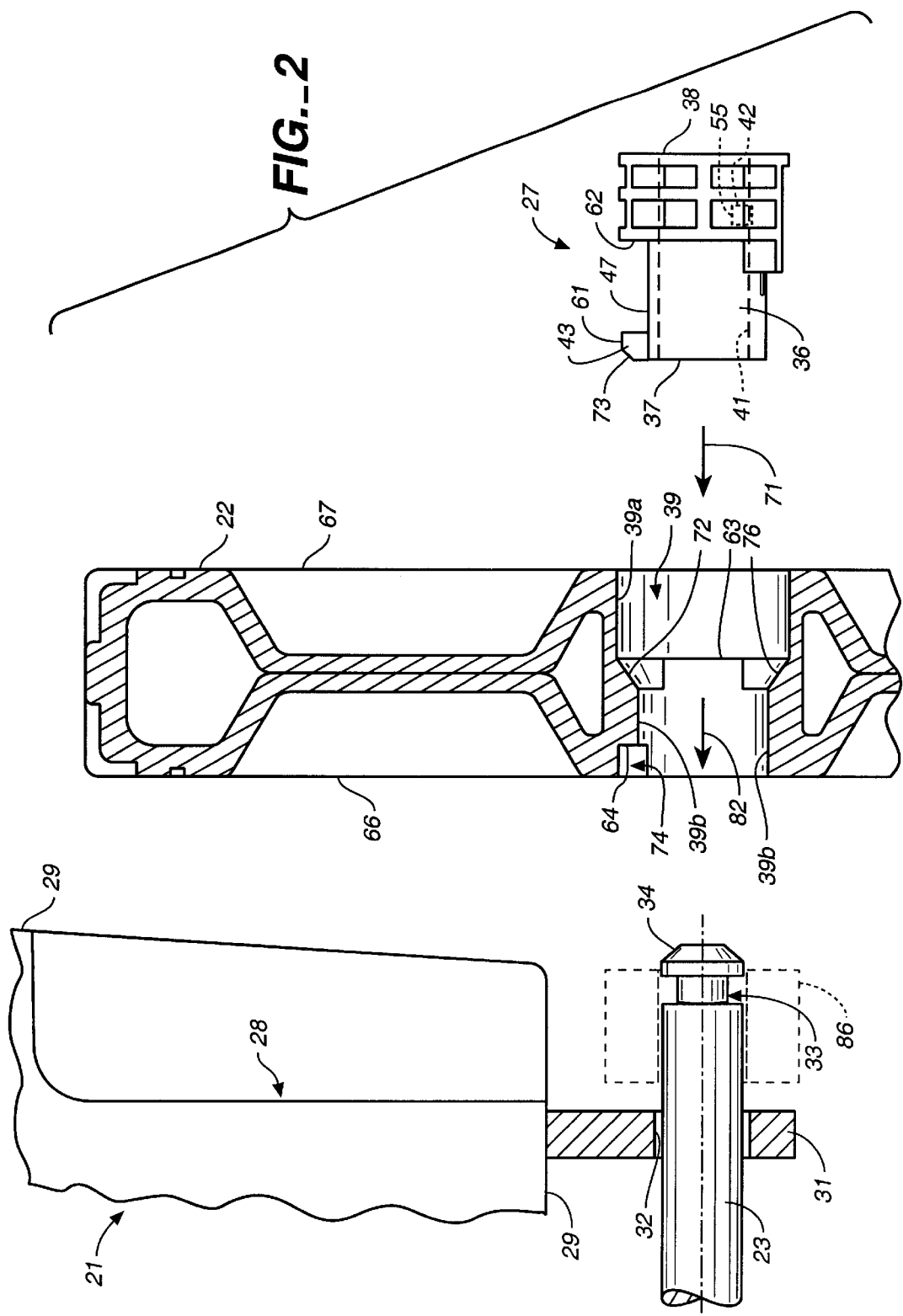

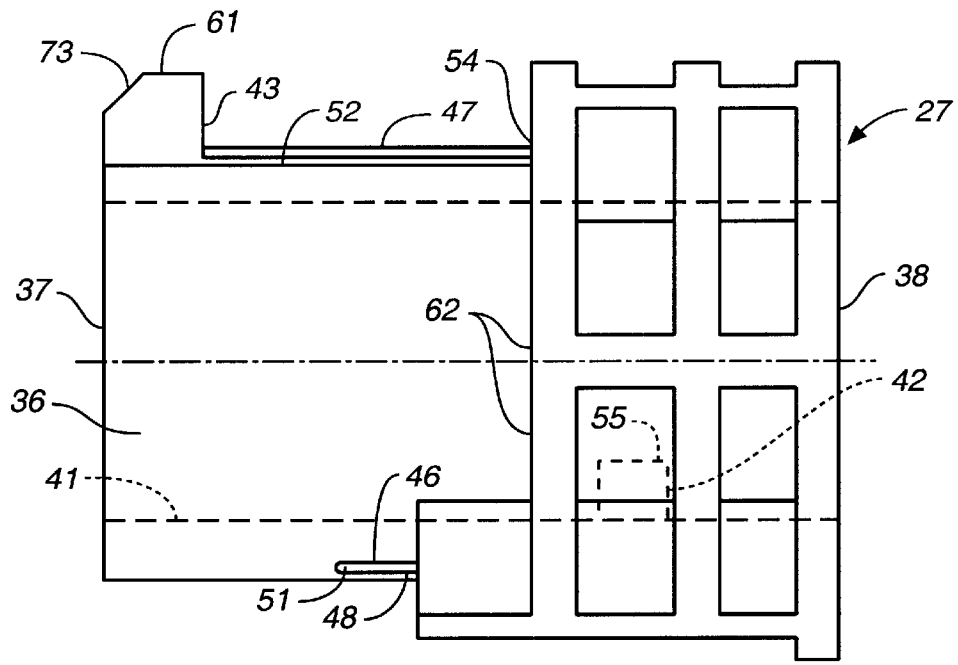
FIG._3
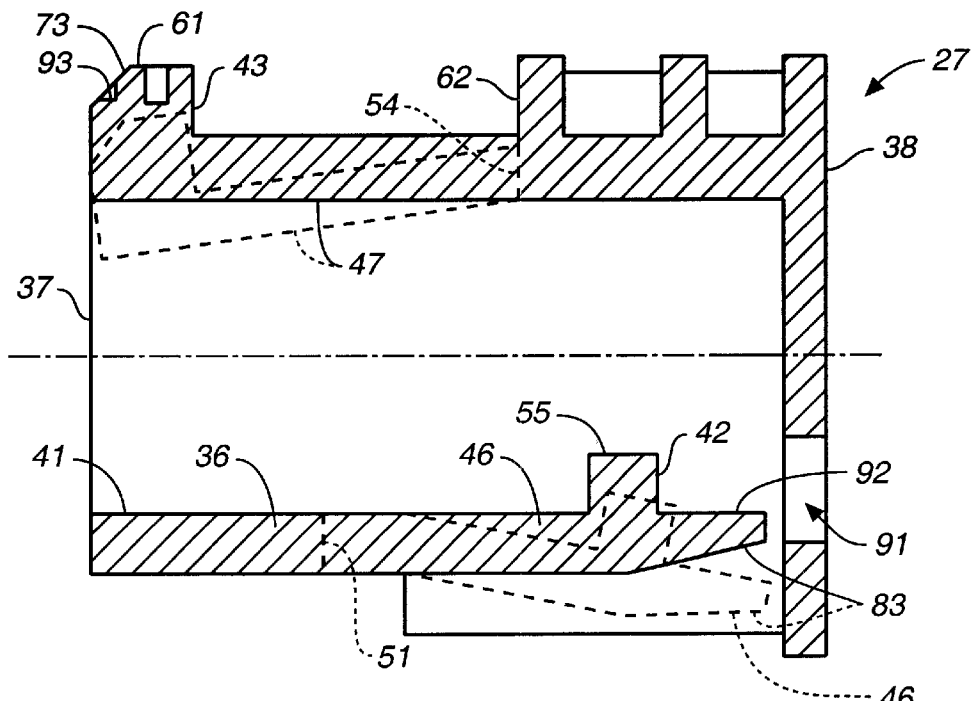
FIG._4

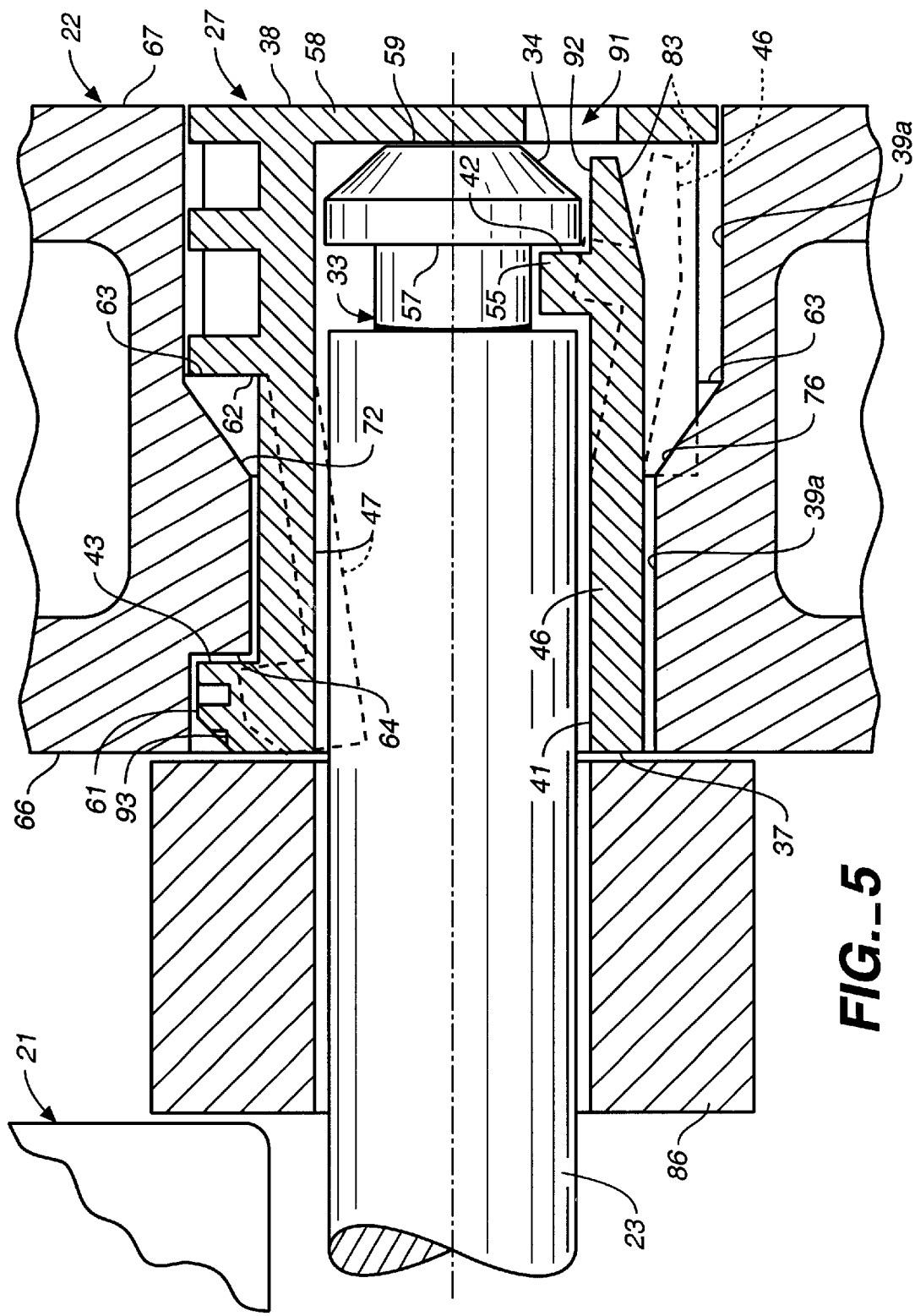
FIG._5

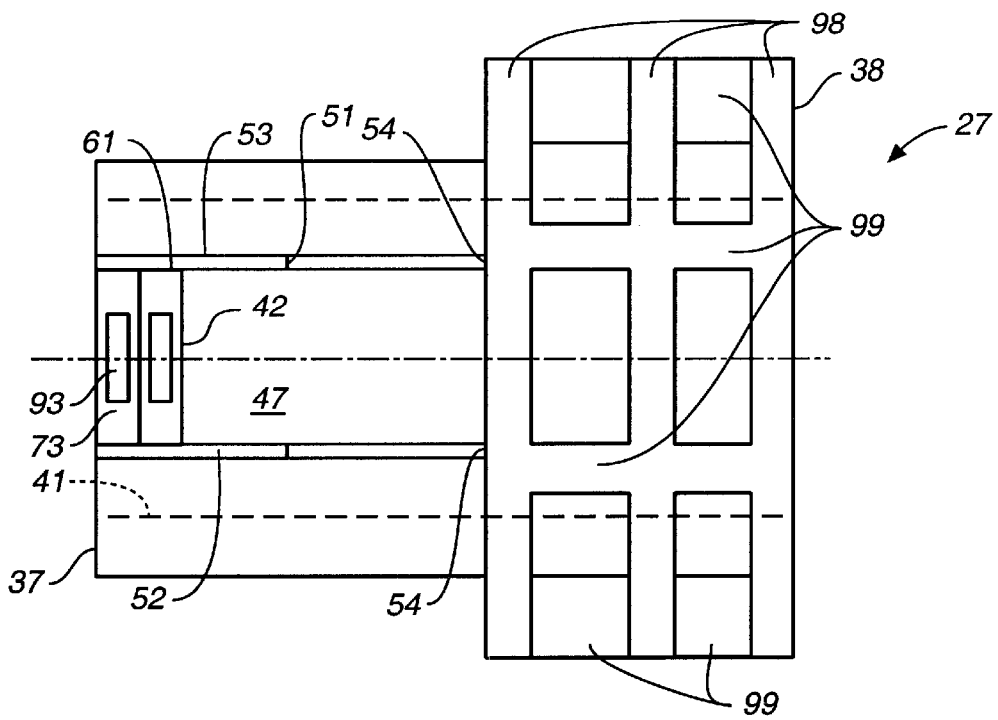
FIG._6
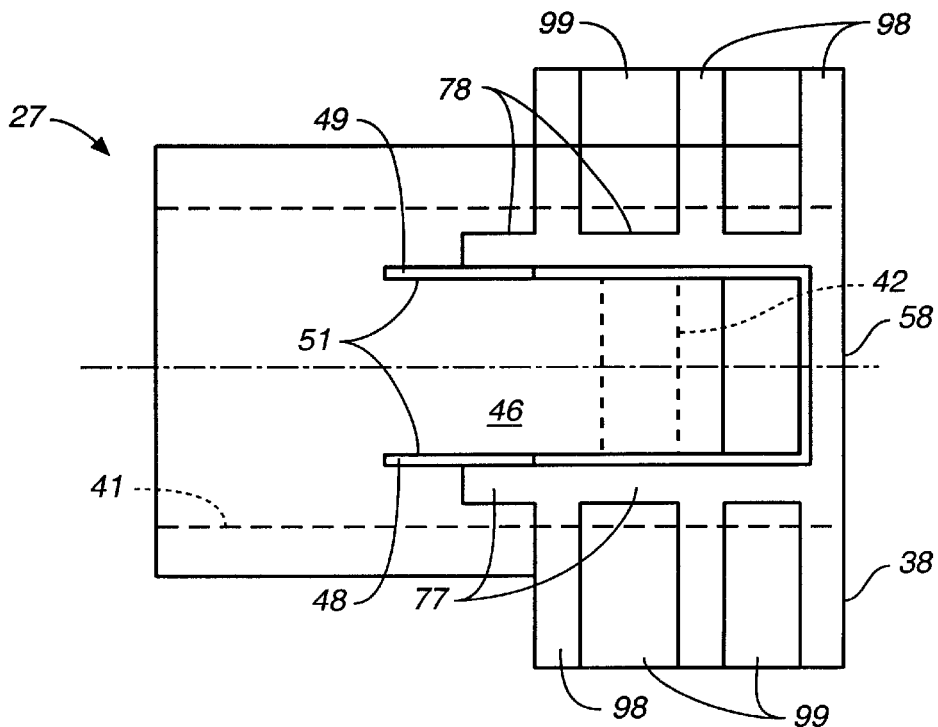
FIG._7

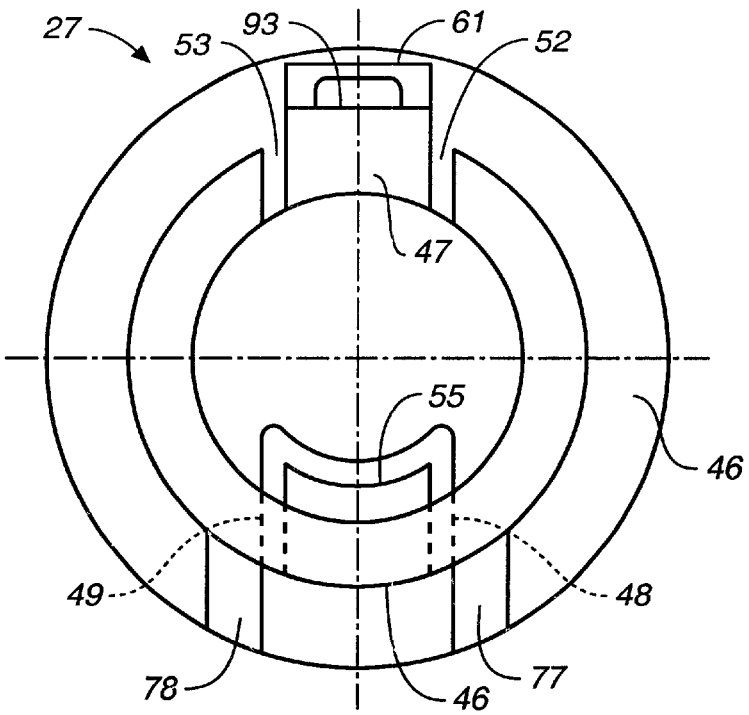
FIG._8
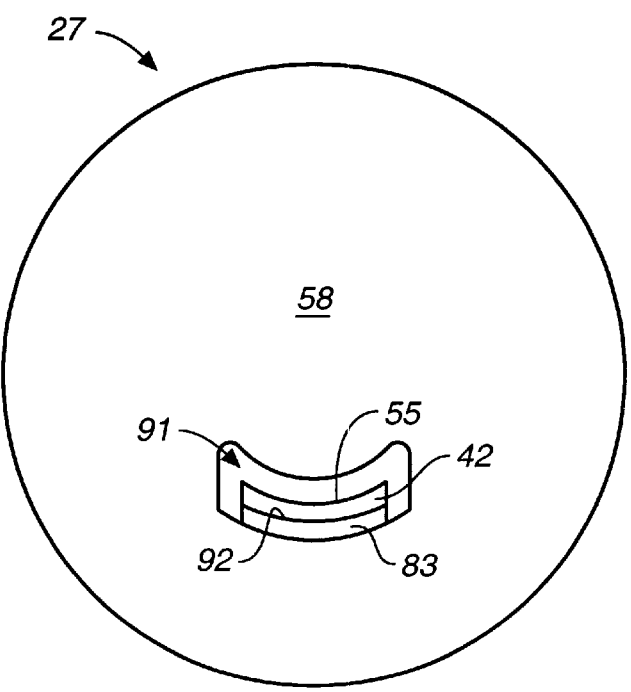
FIG._9

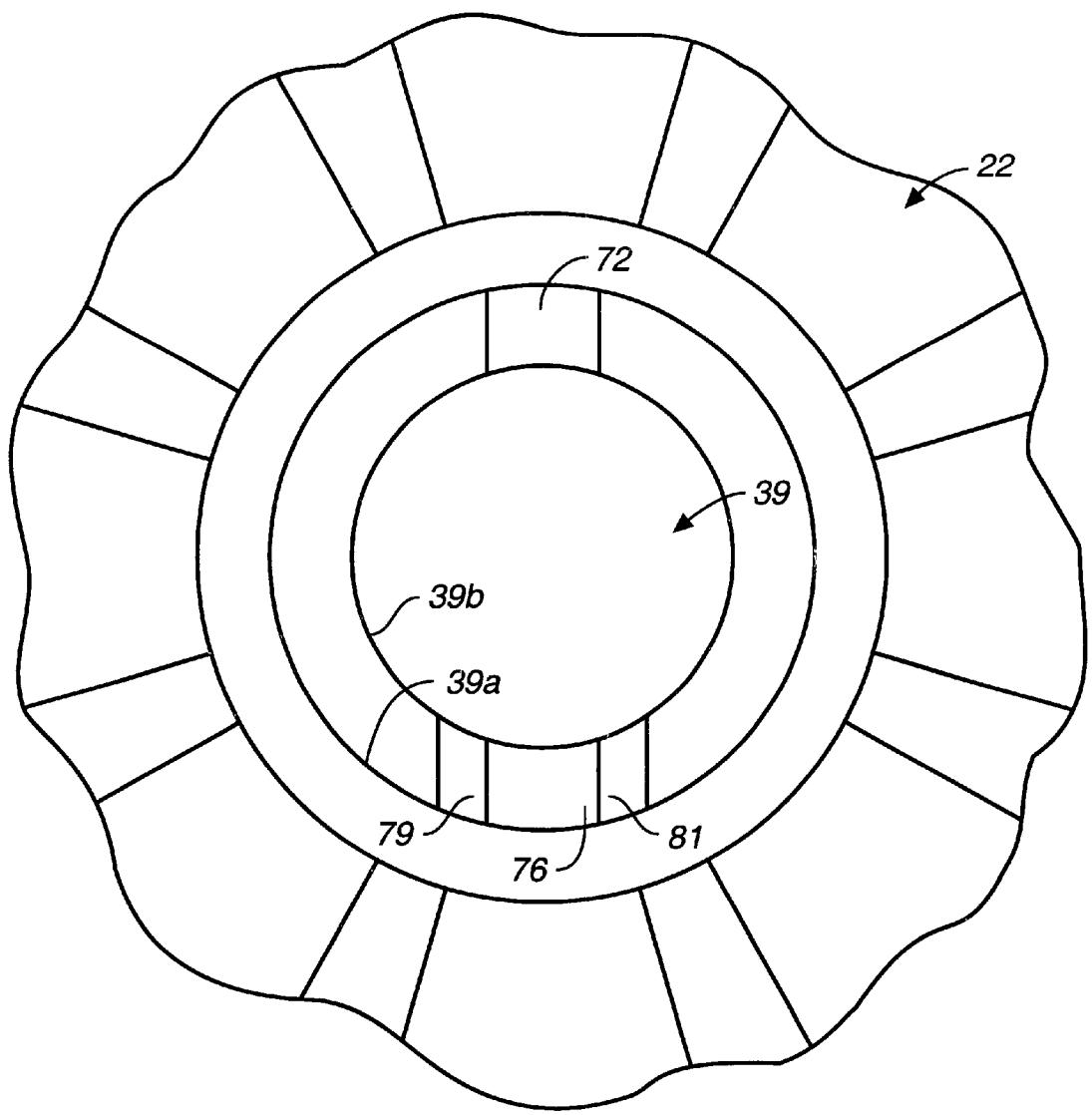
FIG._10

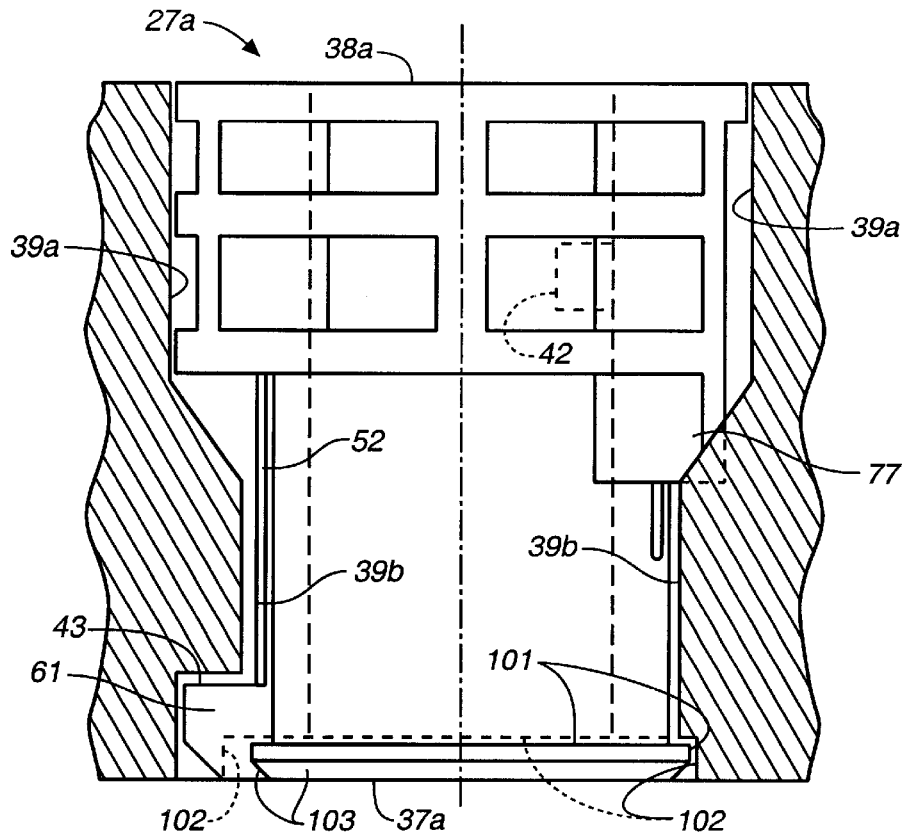
FIG._11
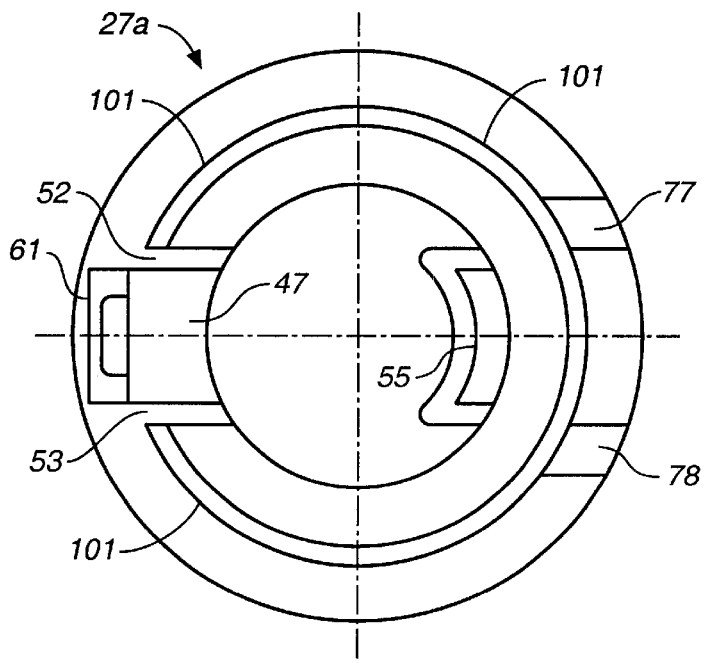
FIG._12

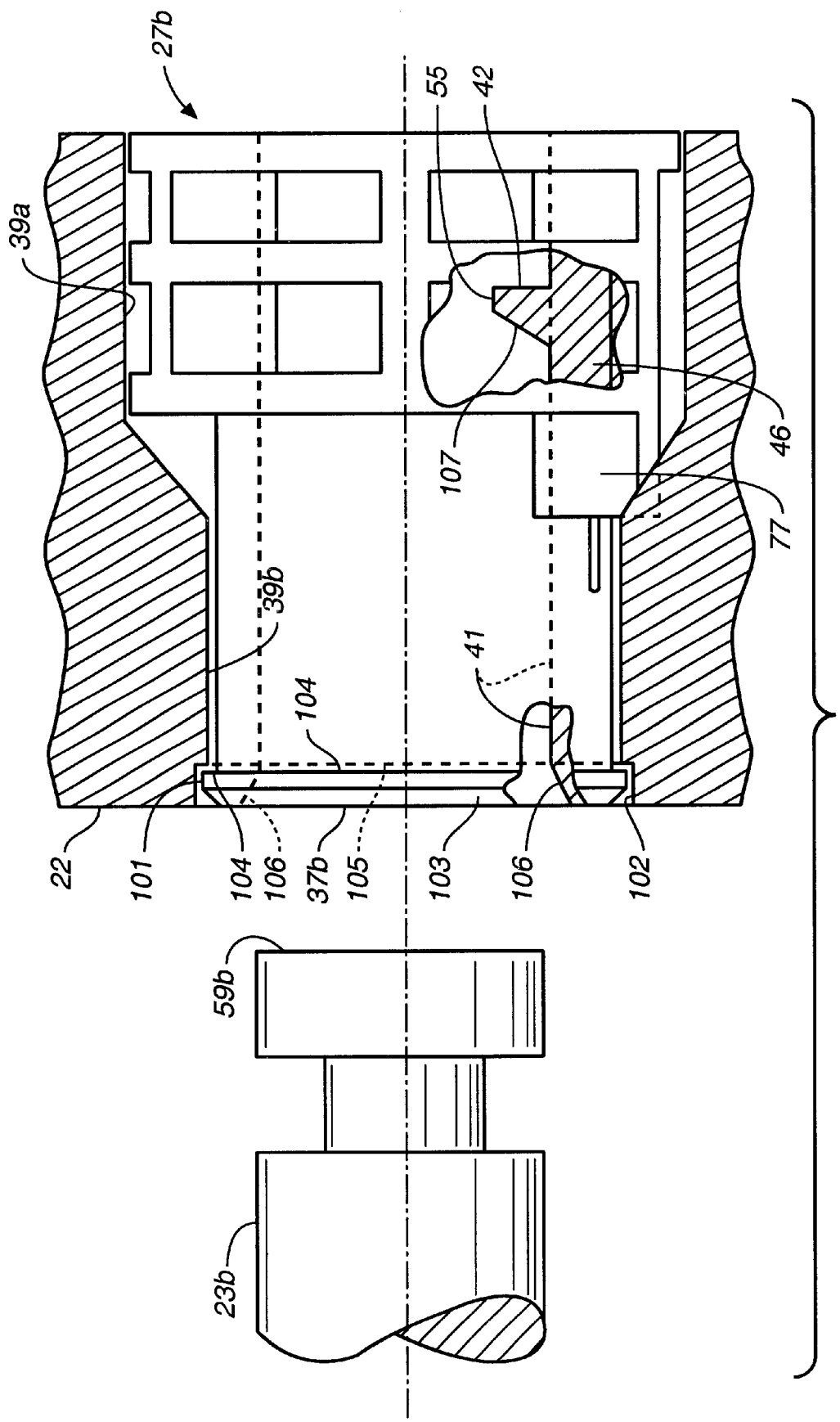
FIG._13

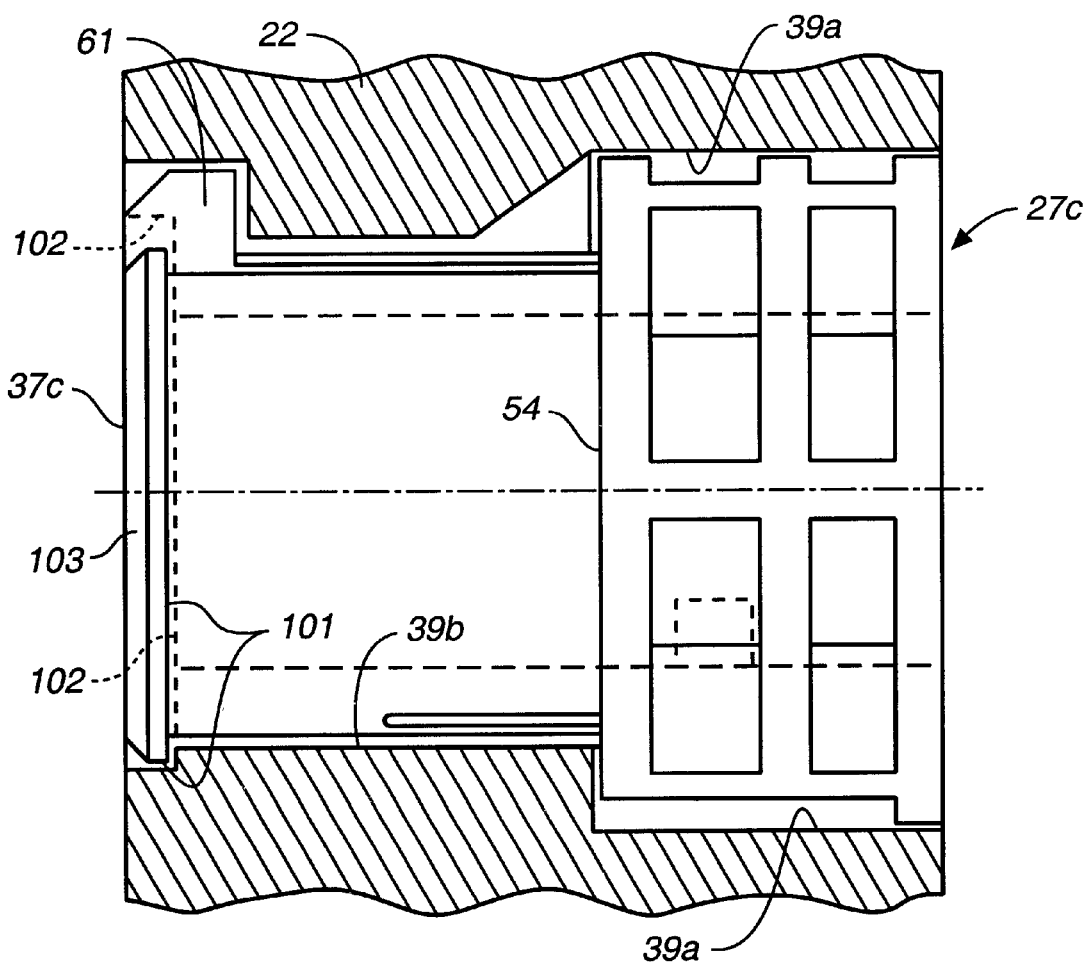
FIG._14

PLASTIC WHEEL ASSEMBLY AND MOUNTING SLEEVE THEREFOR

TECHNICAL FIELD

The present invention relates, in general, to wheel assemblies and the manner of their mounting to and removal from an axle, and more particularly, relates to plastic wheel assemblies of the type used on refuse carts or the like and the manner in which they are mounted to and removed from the axle for such carts.

BACKGROUND ART

The use of plastic wheels on a variety of products has dramatically increased in recent years. One area where such plastic wheels have been widely employed is on wheeled refuse or garbage carts or bins of the type commonly employed by homeowners for their trash. Typically, these carts are formed of an injection or rotationally molded plastic and have injection or blow molded plastic wheels which are mounted on the ends of a metal axle by a hub member. The wheel hub is hammered onto the end of the axle to hold the wheel in place. Removal of such plastic wheels in order to replace or repair the same has been difficult because the hammered hubs require special tools for their removal or essentially must be destroyed to remove them from the axle. Sometimes this process also damages the axles. Thus, more recently, wheel-mounting assemblies have been devised which snap-on to the axle or axle stub to hold the wheel to the axle.

Prior art snap-on wheel-mounting assemblies, however, have been unduly complex, visually unappealing or not well suited to the shock loading and vibration which is commonly encountered in connection with wheeled refuse carts. Moreover, the cost of prior art snap-on couplings has been undesirably high, as has their rate of failure.

Typical prior art wheel-mounting assemblies can be seen in U.S. Pat. Nos. 2,978,277, 3,907,370, 5,222,786, 5,603,555 and 5,716,107.

In U.S. Pat. No. 2,978,277 to Gaudry a two-piece hub assembly is used to secure a wheel on an axle stub. The two hub halves are forced together to simultaneously capture the head of the axle and a dove-tailed cross section of the wheel. This approach is based, in part, upon mating frictional engagement of the hub halves, but under the shock loading and high vibration which refuse carts typically experience frictional engagement of components can be unreliable. The need for multiple hub pieces and an axle with an enlarged head, also is not desirable.

The wheel-mounting assembly of U.S. Pat. No. 3,907,370 to Bard employs a mounting sleeve which is keyed to slide over the keyed end of a specially formed axle. The sleeve mates with spokes in a wheel recess and is held in place by a washer and cotter pin. An annular cap is placed over the cotter pin and washer. This approach requires axle keying, a plurality of parts and the use of tools to secure and release the cotter pin and cap.

A multiple piece hub assembly is shown in U.S. Pat. No. 5,716,107 to Parker et al. In this wheel-mounting assembly a retainer member is used to lock the wheel assembly on a groove or annular notch at the end of the axle. The hub cover is snapped into the wheel and then the wheel snapped onto the axle. Such notched or grooved axles are in wide spread use in connection with trash carts, but this assembly again requires multiple pieces and, in this case, special tools and tedious manipulation are required in order to release the resilient retainer ring fingers from the inside of the wheel so that the wheel can be removed from the axle.

Two patents which employ sleeve assemblies formed for mounting through the wheel in telescoped relation over the axle are shown in U.S. Pat. Nos. 5,222,786 and 5,603,555. The device of U.S. Pat. No. 5,603,555 has a sleeve with at least one snap-acting, axle-engaging shoulder thereon which releasably retains the sleeve on the axle and at least one wheel-engaging shoulder retaining the wheel on the sleeve. As will be seen, however, both of the wheel-mounting sleeve assemblies in these patents are relatively complex and employ a plurality of pieces in order to secure the wheel on the axle.

Accordingly, it is an object of the present invention to provide a wheel assembly and wheel mounting sleeve having a minimum number of parts which can be used to mount plastic wheels, or the like, to a relatively simple grooved metal axle.

A further object of the present invention is to provide a plastic wheel assembly for a trash cart or the like which is economical to manufacture, easy to mount and to remove to enable repair or replacement of the wheel and/or refuse cart, is compact so as to allow its use on a wide variety of different refuse carts, and is durable and capable of withstanding substantial shock loads, side-to-side shifting and vibration during normal use.

The wheel assembly and wheel mounting sleeve of the present invention have other objects and features of advantage which will become apparent from, and are set forth in more detail in, the accompanying Drawing and following Best Mode Of Carrying Out The Invention.

DISCLOSURE OF INVENTION

The wheel mounting sleeve of the present invention includes a sleeve body formed and dimensioned for mounting through a central wheel bearing bore and formed to be telescoped over an axle. The sleeve has at least one axle-engaging shoulder releasably retaining the sleeve on the axle and at least one wheel-engaging shoulder retaining the wheel on the sleeve. The improvement in the mounting sleeve of the present invention is comprised, briefly, of the sleeve body being formed with two resilient radially displaceable, cantilevered fingers. The fingers are cantilevered in opposite directions on circumferentially separated sides of the sleeve to enable the sleeve to be compact in size. The axle-engaging shoulder is provided on a latching lug which extends inwardly from one finger proximate an outer end of the sleeve, and the wheel-engaging shoulder is provided on a latch lug which extends outwardly from the other finger proximate inner end of the sleeve. One embodiment of the sleeve assembly can be mounted into the wheel and onto the axle without the use of tools, and a simple screwdriver can be employed to remove the mounting sleeve from the wheel and axle.

A wheel assembly including a wheel and the present mounting sleeve telescoped together also is provided, as is the further assembly of the axle being telescoped inside the sleeve and wheel.

BRIEF DESCRIPTION OF THE DRAWING

FIG. 1 is a top perspective view of a refuse cart or container having a wheel assembly mounted thereto which is constructed in accordance with the present invention.

FIG. 2 is an enlarged, fragmentary, side elevation view of the wheel assembly and wheel mounting sleeve of the present invention.

FIG. 3 is a further enlarged, side elevation view of the wheel assembly mounting sleeve.

FIG. 4 is a side elevation, in cross-section, corresponding to FIG. 3.

FIG. 5 is a fragmentary, side elevation view, in cross-section, of the sleeve of FIG. 4 showing the mounting sleeve coupled to a wheel and to an axle and mounted by a spacer to a refuse cart or container.

FIG. 6 is a top plan view of the mounting sleeve of FIG. 3.

FIG. 7 is a bottom plan view of the mounting sleeve of FIG. 3.

FIG. 8 is a rear elevation view of the mounting sleeve of FIG. 3.

FIG. 9 is a front elevation view of the mounting sleeve of FIG. 3.

FIG. 10 is a fragmentary, front elevation view of a wheel bearing bore of the wheel assembly of the present invention with the sleeve and axle removed.

FIG. 11 is a side elevation view corresponding to FIG. 3 showing an alternative embodiment of the sleeve and wheel bore.

FIG. 12 is an end elevation view of the sleeve of FIG. 11.

FIG. 13 is a side elevation view corresponding to FIG. 11 of a further alternative embodiment of the sleeve and wheel bore with an alternative embodiment of the axle.

FIG. 14 is a side elevation view corresponding to FIG. 11 of still a further alternative embodiment of the sleeve and wheel.

BEST MODE OF CARRYING OUT THE INVENTION

The wheel mounting sleeve and wheel assembly of the present invention can be used in connection with numerous wheeled devices. A typical, but not limiting, application is to employ the same in a wheeled refuse cart or container of the general type shown in FIG. 1. Thus, cart 21 includes a pair of wheels 22 mounted on an axle 23 to the lower end of the cart body 29. A hinged lid 24 optionally can be provided, and the cart can be tilted or tipped about the wheels using handle 26 so as to enable rolling of the cart for the transport of refuse, for example, between a location for filling the cart and a location for pickup by a refuse disposal company.

Wheels 22 are secured on axle 23 by a wheel mounting sleeve, generally designated 27. In the refuse cart illustrated, body 29 of the cart includes a wheel well or recess area 28 which receives wheels 22, in part to protect the wheels and in part as a cosmetic structure. Many carts, however, do not include wheel wells as illustrated.

In FIG. 2, it will be seen that axle 23 is mounted to the body 29 of the refuse cart by a downwardly-depending ear 31. Typically, there will be a plurality of ears 31, for example four, across the width of the cart body and each ear 31 will be formed with a bore 32 which rotatably receives axle 23. It is also possible for the bore 32 to be dimensioned so that axle 23 does not rotate in the ears and all rotation of the wheel assembly occurs about a substantially stationary axle 23.

The various manufacturers of refuse carts and similar wheeled devices will each have their own cart configuration and manner of mounting the support wheels to the cart. A common element which virtually all cart manufacturers use, however, is an axle constructed as shown in FIG. 2. Thus, axle 23 typically includes an annular groove or notch 33 proximate each end. Moreover, the ends are chamferred at 34 so as to facilitate insertion of the axle into wheel bearing bores and various mounting structures. Axle 23 will usually be formed of a carbon steel so as to provide sufficient strength and shock resistance for support of substantial loads in cart 21. One of the important features of the wheel assembly and mounting sleeve of the present invention is that it can be used with, and retrofit to, a wide variety of different carts and other wheeled devices having such axles.

Cart manufacturers often buy plastic wheel assemblies from outside suppliers. The wheel assembly suppliers, therefore, are able to construct a wheel which mounts to the standard industry axle 23 using various wheel mounting structures, and the cart manufacturers assemble the same to form refuse cart 21.

Referring now to FIGS. 2–7, the details of construction of wheel 22 and wheel mounting sleeve 27 can be set forth. Wheel mounting sleeve 27 includes a body 36 having an inner end 37, which is closest to cart 21, and an outer end 38, which is outwardly facing away from cart 21. The sleeve body is formed and dimensioned for mounting through a wheel bearing bore, generally designated 39, in wheel 22. Moreover, body 36 of sleeve 27 is also formed with a central bore 41 which is dimensioned for sliding telescopic insertion over axle 23. The wheel, sleeve and axle are secured together by further forming sleeve 27 with at least one axle-engaging shoulder 42 and at least one wheel-engaging shoulder 43.

The improved wheel mounting sleeve of the present invention is much more compact and much less complex than prior art devices. Release and removal of the wheel of FIGS. 1–10, for example, can be accomplished using a simple tool, such as a screwdriver. In sleeve 27 of the present invention, sleeve body 36 is formed with two resilient, radially displaceable, axially extending, cantilevered fingers 46 and 47. Fingers 46 and 47 are cantilevered and extend axially in opposite directions along the axial length of body 36.

As best can be seen from FIGS. 4 and 7, sleeve finger 46 is formed by a pair of slots 48 and 49 which terminate at 51 somewhat more than half-way along the axial length of body 36 from outer end 38 of the sleeve toward the inner end. End 83 of finger 46 stops short of sleeve end wall 58 so that finger 46 can be outwardly displaced to the dotted line position shown in FIGS. 4 and 5. Finger 46 also will resiliently snap back automatically to the solid line position shown in the figures when the force urging the finger outwardly is not present. Slots 48 and 49 in sleeve body 36, therefore, allow finger 46 defined therebetween to resiliently flex about a horizontal axis joining ends 51 of the slots. The length of slots 48 and 49 is selected, based upon the sleeve wall thickness and material, to enable sufficient flexure for fatigue-free displacement of axle-engaging shoulder in and out of engagement with axle notch 33 in a manner described below.

Second finger 47 is formed by a pair of slots 52 and 53, which terminate at 54 somewhat beyond the midpoint of the sleeve from inner end 37. Slots 52 and 53 in body 36 of the sleeve, therefore, similarly allow finger 47 to be resiliently inwardly displaced to the dotted line position shown in FIGS. 4 and 5 and thereafter automatically snapped back to the solid line position.

As can be seen from FIG. 8, resilient fingers 46 and 47 are circumferentially spaced from each other by approximately 180° so that the slots 48, 49, 52 and 53 in the body of the sleeve do not weaken the overall sleeve strength significantly. Other spacings of the resilient fingers 46 and 47 around the circumference of the sleeve can be accommodated, however, and multiple resilient fingers for each of a plurality of axle-engaging shoulders and a plurality of wheel-engaging shoulders could be provided. It has been found, however, that a single resilient finger 46 can be used to latch the sleeve 27 to axle 23, and that a single resilient finger 47 can be used to latch sleeve 27 to the wheel.

Axle-engaging shoulder 42 is preferably provided on a lug 55 which extends radially inwardly into bore 41 in the sleeve. As best may be seen in FIG. 5, the axle-engaging shoulder 42 bears upon a shoulder 57 defining axle notch 33. Thus, shoulder 42 engages shoulder 47 to prevent displacement of axle 23 in an inward direction out of sleeve 27. Generally, a single shoulder in a non-metallic sleeve facing in one direction cannot be used alone to latch the wheel to the sleeve or the sleeve to the axle without fatiguing and failing over time. Normally, a pair of oppositely facing shoulders will be provided. Relative displacement of axle 23 inside sleeve 27 in an outward direction toward end 38 of the sleeve is limited by a second axle-engaging shoulder axially spaced from first-named shoulder 42. In the preferred embodiment, the second axle-engaging shoulder is provided by an end wall 58 on sleeve 27 which engages end 59 of axle 23. Thus, sleeve 27 is latched in a fixed axial position on axle 23 by engagement of the axle-engaging shoulder 42 with notched defining shoulder 57 and by engagement by end 59 of the axle with end wall 58 of the sleeve.

In the preferred form, lug 55 is not as wide as notch 33, but it will be understood that the lug 55 also could be used to latch the sleeve to axle 23 against movement in both an inward and an outward direction. The use of end wall 58 to resist outward displacement of the axle in bore 41, as opposed to lug 55, is advantageous because a greater surface area can be provided than on lug 55 to withstand considerably more axial force. There will be, therefore, less tendency for lug 55 to fail if it only resists withdrawal of the axle from bore 41.

In order to latch sleeve 27 to wheel 22, again, a pair of opposed wheel shoulders will normally be employed. Sleeve 27 will have a shoulder facing in a direction opposed to wheel-engaging shoulder 43. This can be provided in several manners, but in the present invention wheel-engaging shoulder 43 faces toward outer end 38 of the sleeve and engages an inwardly facing shoulder 64 in wheel bearing bore 39. As best can be seen in FIG. 2, the wheel surface against which wheel-engaging shoulder 43 bears is preferably provided by a notch or pocket 64 which is recessed from the inner side 66 of the wheel. This allows the sleeve 27 to be latched to the wheel without extending beyond the inner side 66. FIG. 5 illustrates sleeve 27 of the present invention as mounted and latched in place in wheel 22, and it will be seen that it does not extend beyond either side 66 or 67 of the wheel. The radially outwardly extending second wheel-engaging shoulder 62 on the sleeve engages shoulder 63 on the wheel and is axially spaced from the first-named shoulder 43 and faces toward inner end 37 of the sleeve. The second wheel-engaging shoulder also could be provided by the inwardly facing side of lug 61 on which first-named shoulder 43 is provided, if notch 64 in bearing bore 39 was axially spaced from inner side 66 of the wheel. This is not as desirable as using sleeve shoulder 62, again because lug 61 would be unduly stressed and because lug 61 is provided with a ramp 73 thereon, which will be described in detail below.

In the preferred form of wheel mounting sleeve of the present invention, the diameter of central bore 41 through the sleeve is dimensioned to freely rotate on axle 23. The sleeve finger latching structure as shown in the drawings, in effect, keys the sleeve so that it rotates as a unit with the wheel, making it preferable for the sleeve to rotate on the axle. Rotation of the entire axle within mounting ears 31 is not required and generally only a slight or lesser amount of relative rotation occurs. As described below, however, axles with transverse bores proximate the ends or flat notches also could be used, but then the sleeve would not be able to rotate relative to the axle and the axle must rotate relative to ears 31.

Having described the principal features of the mounting sleeve and wheel assembly of the present invention, the manner of employing the sleeve to mount wheel 22 to axle 23 can be set forth. As above noted, wheel 22 typically will be manufactured by a company other than the manufacturer of trash cart 21. This does not have to be the case, but mounting sleeve 27 of the present invention is well suited to assembly into wheel 22 with the sleeve in it by one manufacturer and thereafter mounting of wheel 22 with the sleeve in it on axle 23 by the trash cart manufacturer. Sleeve 27, therefore, can be inserted into wheel bearing bore 39 by simply sliding the wheel axially in the direction of arrow 71 in FIG. 2. Mounting sleeve 27 should be aligned so that lug 61 on resilient finger 47 is aligned with a ramp 72 in bore 39. As best may be seen in FIGS. 2 and 10, ramp 72 tapers inwardly from a large diameter portion 39*a* of bore 39 to small diameter portion 39*b* of the wheel bearing bore. It is preferable that lug 61 be formed with a ramp or tapered section 73 which slidably engages ramp 72 in bore 39. The lug ramp and bore ramp, therefore, cooperate to urge resiliently displaceable finger 47 inwardly to the broken line position as shown in FIG. 4. This allows lug 61 to pass into small diameter portion 39*b* of the bearing bore until the wheel-engaging shoulder 43 passes beyond the oppositely facing shoulder 64 in bore 39. Once shoulder and lug 43 pass beyond wheel shoulder 64, finger 47 snaps outwardly into the notch 74 which is formed to receive lug 61, as shown in FIGS. 2 and 5.

In order to further enhance the alignment of sleeve 27 in bore 39, bore 39 can be provided with a second ramp 76 (FIGS. 2 and 10) which is dimensioned to pass between axially extending ribs 77 and 78 (see FIGS. 7 and 8) on sleeve 27. As will be seen from FIG. 10, recesses or pockets 79 and 81 are provided on either side of ramp 76 and are dimensioned to receive the ends of axially extending ribs 77 and 78. Thus, the pockets 79 and 81 tend to cause seating of sleeve 27 in the proper alignment for snap-acting latching of lug 61 in pocket 74 as the sleeve is moved inwardly in bore 39. Typically, the wheel with the sleeve or hub 27 snapped in place will now be shipped to the cart manufacturer.

In order to assemble wheel 22 to axle 23, the wheel normally will be moved in the direction of arrow 82 (see FIG. 2) over chamferred end 34 of the axle. This will cause the bore 41 in sleeve 27 to slide over the axle until the inwardly extending lug 55 engages chamferred end 34 of the axle. As the wheel and sleeve and urged further inwardly over the axle, chamferred end 34 outwardly displaces lug 55 and resilient finger 46 to the dotted line position of FIGS. 4 and 5 so that lug 55 can pass over the end of the axle until it snaps into annular notch 33. This occurs at about the same time that axle end 59 reaches, or is very closely proximate to end wall 58 of the sleeve. The result is that first, outwardly facing axle-engaging shoulder 42 snaps in behind the inwardly facing shoulder 57 on the axle, while the second, inwardly facing, axle-engaging shoulder or wall 58 abuts the end of the axle so as to prevent relative axial movement of axle 23 and the sleeve and wheel assembly.

As will be seen from FIGS. 4 and 5, it is preferable that outer end 83 of finger 46 be inwardly tapered so as to enable resilient outward displacement of finger 46 without engaging the large diameter portion 39a of the wheel bearing bore. While assembly of the wheel to the axle has been described in terms of moving the wheel over the end of the axle, it will be obvious that the axle can be moved into the wheel and sleeve assembly, or there can be a combination of relative movement between the components.

One of the substantial advantages of the mounting sleeve of the present invention is that it is sufficiently compact so as not to extend from either side of wheel 22. Thus, the mounting sleeve and wheel of the present invention can be used on a wide variety of wheeled carts, containers, vehicles and the like, either by snapping the wheel assembly directly onto the axle, or by adding a spacer 86, as shown in FIG. 5 in solid lines and in FIG. 2 in broken lines. For some carts, spacer 86 would not be employed, but the configuration of wheel receiving well 28 may be such that it would be advantageous, or necessary to employ a spacer sleeve 86. Forming sleeve 86 with sleeve 27 as monolithic or one-piece member is possible but generally not desirable because it increases molding costs and reduces adaptability to variations in cart designs.

One of the substantial advantages of the wheel mounting sleeve and wheel assembly of FIGS. 1–10 is that the various components can be disassembled using only a simple blade-type screwdriver. As will be seen from FIGS. 4 and 9, end wall 58 of sleeve 27 is formed with an opening 91 through to bore 41 which provides access to end 83 of resilient finger 46. Thus, a screwdriver blade can be placed on the upwardly facing surface 92 of finger 46 and the resilient finger displaced downwardly until lug 55 clears annular notch 33 on the axle. This releases the sleeve from the axle and thereby allows the wheel and sleeve to be moved outwardly so as to separate the wheel assembly from axle 23. Outward extension 83, beyond the axle-engaging should 42, is provided, therefore, to enable release of the sleeve from the axle. An additional advantage of the configuration of sleeve 27 and its end wall 58 and opening 91, is that it is not readily apparent to vandals how to remove wheels 22 from axle 23.

Once the wheel has been removed from the axle, a blade screwdriver also can be used to push down on a step or notch 93 in lug 61 in order to cause resilient displacement of finger 47 to the dotted line position in FIGS. 2 and 4. Such displacement releases lug 61 from notch 74. The sleeve can then be urged axially outwardly of wheel bearing bore 39. This easy disassembly process can be performed by the home owner using the simplest of tools so as to enable replacement of a damaged wheel or axle or sleeve. Obviously, both the wheel and cart manufacturers also can easily perform the disassembly task, and then the wheel can be remounted to the axle without tools.

In the preferred form, mounting sleeve 27 is monolithically formed as a one-piece member from a relatively impact resistant plastic. This can be accomplished by injection molding sleeve 27 from a plastic such as an acetyl-based copolymer.

FIGS. 6 and 7 illustrate a reinforcing rib pattern which can be provided on the injection molded sleeve to provide added strength, without requiring too much additional material. Circumferential ribs 98 increase radial strength and provide a large diameter which can slidably mate with large bore diameter 39a of the wheel. Moreover, circumferential ribs. 98 inwardly of end 38 also can be seen from FIG. 5 to be aligned axially on either side of axle notch 33 so as to provide additional radial strength in the sleeve where it engages the axle and spans across notch 33.

Longitudinal ribs 77 and 78 reinforce sleeve body 36 proximate slots 48 and 49, and key the sleeve against circumferential movement relative to wheel 22 by interengaging with pockets 79 and 81 in the wheel bore (FIG. 10). Longitudinal ribs 99 are circumferentially spaced to provide further sleeve strength.

Wheel 22 is most preferably blow molded or injection molded out of a plastic, such as high density polyethylene. The wheel is formed in the manner well known in the industry, but with a stepped wheel bearing bore 39a, 39b and notches 74 and ramps 72, 76 so as to cooperate with the resilient fingers on sleeve 27. Cantilevering the resilient fingers in opposite directions allows the sleeve to be compact so that it does not extend beyond the wheel. Any spacing problems can be easily handled by separate sleeves or spacers 86. The result is an assembly in which the wheel and mounting sleeve can be shipped as a unit in an already assembled state, and the sleeve simply snapped on the axle without the use of tools.

While the sleeve and wheel assembly of FIGS. 1–10 is suitable for use for many applications, it has been found that greater strength and durability can be achieved in the wheel-sleeve connection if the inner end 37a, 37b, 37c of the sleeve includes an outwardly projecting rib 101, as shown in the embodiments of FIGS. 11–14. Thus, as shown in FIGS. 11 and 12, sleeve 27a is formed with an annular, radially outwardly projecting rib 101 at inner end 37a which is matingly received in annular recess 102 in the inner end of wheel bearing bore 39b.

Sleeve 27a must be press-fit or driven into the wheel bore because the diameter of annular rib 101 is greater, for example, by about 0.040 to 0.100 inches, than the diameter of bore 39b. A rib height of 0.050 inches is preferred. Accordingly, rib 101 preferably has a chamfer 103 on its leading edge to facilitate insertion. In the form of sleeve shown in FIGS. 11 and 12, slots 52 and 53, which define finger 47, also function to allow inward collapsing of the sleeve inner end 37a to allow passage of rib 101 down the smaller bore 39 until the rib can resiliently expand outwardly into recess 102. The circumferentially extending rib 101 interlocks or seats with recess 102 in a manner which better stabilizes sleeve 27a against side-to-side shifting or relative movement in wheel bore 39a, 39b. Reduction of relative movement further resist axial separation of the sleeve and wheel, as well as reducing vibration wear of the parts.

The sleeve of FIGS. 11 and 12 is best inserted using a mounting fixture which presses outer end 38a of sleeve 27a into the wheel bearing bore 39a, 39b, but a hammer also can be used. Removal of sleeve 27a is more difficult as a result of rib 101 and recess 102. Depending on the rib height, removal may require destruction of sleeve 27a. A rib of 0.050 inches, for example, will be difficult to remove, even with tools, without damage to the sleeve and/or wheel bore. The assembly's durability is so significantly increased by the presence of the rib, however, as to be an acceptable trade-off.

In FIG. 13, sleeve 27b again is provided with an annular chamferred rib 101 at its inner end 37b, but latching finger 47 and lug 61 have been eliminated. Thus, rib 101 provides a shoulder 104 which interengages shoulder 105 of recess 102 in wheel bore 39a to secure the sleeve to the wheel. Rib chamfer 103 allows ribbed end 37b of the sleeve to be forced down bore 39a until the rib resiliently expands out into recess 102. Again, a sleeve pressing fixture is preferred for forcing the sleeve into bore 39a, 39b of the wheel.

In the embodiment of FIG. 13, the inner end of sleeve bore 41 also has been chamferred at 106 to guide the entrance of axle 23b into bore 41. Moreover, axle 23b can be seen to have an end 59b which is not chamferred. The tooth or lug 55 on arm 46, therefore, has been modified to include a ramp 107 which progressively engages and outwardly displaces finger 46 as end 59b is urged axially down sleeve bore 41. Chamfer 106 is advantageously present on sleeve bore 41 even when an axle having a chamferred end, such as axle 23, is employed.

Axles 23 and 23b are shown with an annular notch 33 or groove into which sleeve lug 55 snaps to secure the sleeve to the axle. It will be understood, however, that an unnotched axle also could be employed which has a transversely extending bore or drilled hole. The axle-engaging lug 55 and shoulder 42 could snap into the transverse bore to latch the sleeve to the axle. In such an embodiment, the sleeve could not rotate relative to the axle, but the axle could be rotatably mounted to the cart ears 31. A similar variation in the axle would be providing two flats on opposite sides of the axle inwardly of the ends, with the resulting shoulders being engaged by a lug or lugs on the sleeve.

Finally, sleeve 27c of FIG. 14 is similar in structure to sleeve 27a, except that longitudinal indexing ribs 77 and 78 have been terminated at shoulder 54 and ramp 76 and pockets 79 and 81 in bore 39a have been eliminated. Inner end 37c of the sleeve again has chamferred rib 101 which must be press-fit through bore 39a until it seats in recess 102. In the fig. 14 embodiment, lug 61 keys sleeve 27c to wheel 22 against relative rotation.

What is claimed is:

1. A wheel mounting sleeve comprising:
   a sleeve body having an inner end and an outer end and formed and dimensioned for mounting through a wheel bearing bore in a wheel, said body having a sleeve bore therethrough dimensioned for mounting in telescoped relation over an axle;
   said sleeve body having at least one axle-engaging shoulder thereon retaining said sleeve on the axle and at least one wheel-engaging shoulder thereon retaining the wheel on said sleeve;
   said sleeve body being further formed with at least one resilient, radially displaceable, axially extending, cantilevered finger, said axle-engaging shoulder extending radially inwardly from said finger proximate said outer end of said sleeve, and said finger proximate said outer end of said sleeve, said wheel-engaging shoulder extending radially outwardly from proximate said inner end of said sleeve; and
   said sleeve body having an axial length dimension not substantially greater than the length dimension of the wheel bearing bore whereby said sleeve is substantially flush with the wheel of an inner side and at an outer side of the wheel.

2. The wheel mounting sleeve as defined in claim 1 wherein,
   said wheel-engaging shoulder faces toward said outer end of said sleeve, and
   said body is formed with a radially outwardly extending second wheel-engaging shoulder axially spaced from the first-named wheel-engaging shoulder and facing toward said inner end of said sleeve.

3. The wheel mounting sleeve as defined in claim 1 wherein,
   said sleeve body has a central bore dimensioned to freely rotate on said axle.

4. The wheel mounting sleeve as defined in claim 1 wherein,
   said sleeve body is formed with an opening in an outer end thereof dimensioned for insertion of a tool to enable radially outward displacement of said axle-engaging shoulder to a position releasing said sleeve from said axle.

5. The wheel mounting sleeve as defined in claim 4 wherein,
   said finger carrying said axle-engaging shoulder further includes an extension portion extending axially outwardly of said axle-engaging shoulder for engagement by a tool to enable radial outward displacement of said finger.

6. The wheel mounting sleeve as defined in claim 1 wherein,
   said sleeve is injection molded from an acetyl-based plastic.

7. The wheel mounting sleeve as defined in claim 1, and
   a spacer sleeve separate from said mounting sleeve and formed to be mounted on the axle in abutting relation to said mounting sleeve.

8. The wheel mounting sleeve as defined in claim 1 wherein,
   said wheel-engaging shoulder is provided by an annular outwardly projecting rib proximate said inner end of said sleeve; and
   said rib is chamferred in a direction of insertion of said sleeve into said wheel bearing bore.

9. A wheel mounting sleeve including a sleeve body having an inner end and an outer end and formed and dimensioned for mounting through wheel bearing bore in a wheel and into telescoped relation over an axle, said sleeve having at least one axle-engaging shoulder thereon retaining said sleeve on said axle and at least one wheel-engaging shoulder thereon retaining said wheel on said sleeve, the improvement comprising:
   said sleeve body being formed with at least one resilient, radially displaceable, axially extending, cantilevered finger, said finger being defined by a pair of substantially parallel axially extending slots in said sleeve, said axle-engaging shoulder extending radially inwardly from said finger proximate said outer end of said sleeve, said wheel-engaging shoulder extending radially outwardly from proximate said inner end of said sleeve, and a pair of axially extending reinforcing ribs circumferentially outward of and adjacent to said slots defining said finger.

10. In a wheel mounting sleeve including a sleeve body having an inner end and an outer end and formed and dimensioned for mounting through wheel bearing bore in a wheel and into telescoped relation over an axle, said sleeve having at least one axle-engaging shoulder thereon retaining said sleeve on said axle and at least one wheel-engaging shoulder thereon retaining said wheel on said sleeve, the improvement comprising:
   said sleeve body being formed with two resilient, radially displaceable, axially extending, cantilevered fingers, said fingers being cantilevered from and extending in opposite axial directions on circumferentially separated sides of said body, said axle-engaging shoulder extending radially inwardly from one of said fingers proximate said outer end of said sleeve, said wheel-engaging shoulder is provided by a radially outwardly extending lug on the other of said fingers proximate said inner end of said sleeve, and an inwardly facing side of said lug is formed with an axially extending ramp facilitating radial inward displacement of said finger during mounting of said sleeve in said wheel bearing bore.

11. The wheel mounting sleeve as defined in claim 10 wherein, said lug is formed with a tool surface thereon oriented for application of a radially inward force on said finger to move said wheel-engaging shoulder out of engagement with said wheel.

12. In a wheel mounting sleeve including a sleeve body having an inner end and an outer end and formed and dimensioned for mounting through wheel bearing bore in a wheel and into telescoped relation over an axle, said sleeve having at least one axle-engaging shoulder thereon retaining said sleeve on said axle and at least one wheel-engaging shoulder thereon retaining said wheel on said sleeve, the improvement comprising:

said sleeve body being formed with at least one resilient, radially displaceable, axially extending, cantilevered finger, said axle-engaging shoulder extending radially inwardly from said finger proximate said outer end of said sleeve, said wheel-engaging shoulder extending radially outwardly from proximate said inner end of said sleeve, and said body is formed with a plurality of circumferentially extending outwardly projecting reinforcing ribs proximate said outer end of said sleeve, said ribs being axially spaced apart and axially aligned to span across a notch in said axle.

13. A wheel assembly comprising:

an axle having a circumferentially extending notch proximate and inwardly of an axially outer end thereof;

a wheel having a central wheel bearing bore extending therethrough from an inner side to an outer side of said wheel, said wheel bearing bore having a notch axially recessed from said inner side of said wheel and opening radially inwardly to said wheel bearing bore; and a wheel mounting sleeve having a body formed with a bore therethrough dimensioned for, and slidably mounted over, said axle; said body having an outer diameter formed for, and slidably inserted into, said wheel bearing bore; said body further being formed with two resilient, radially displaceable, axially extending, cantilevered fingers thereon; said fingers each being cantilevered from, and extending in, opposite directions on circumferentially spaced sides of said body; one of said fingers extending from said middle of said sleeve toward an outer end of said sleeve and having a radially inwardly extending axle-engaging shoulder thereon mounted in said notch in said axle; and the other of said fingers extending from said middle of said sleeve toward an inner end of said sleeve having a radially outwardly extending wheel-engaging shoulder thereon engaging an inwardly facing surface defining said notch in wheel bearing bore.

14. The wheel assembly as defined in claim 12 wherein, said wheel-engaging shoulder faces toward said outer end of said sleeve, and said body is formed with a radially outwardly extending second wheel-engaging shoulder axially spaced from the first-named wheel-engaging shoulder, facing toward said inner end of said sleeve and engaging an outwardly facing surface on said wheel.

15. The wheel assembly as defined in claim 12 wherein, said wheel-engaging shoulder faces toward said outer end of said sleeve, and said body is formed with a radially inwardly extending second axle-engaging shoulder axially spaced from the first-named wheel-engaging shoulder, facing toward said inner end of said sleeve, and engaging an outer end of said axle.

16. The wheel assembly as defined in claim 13 wherein, said wheel-engaging shoulder is provided on an outwardly facing side of a radially outwardly extending lug on one of said fingers, and an inwardly facing side of said lug is formed with an axially extending ramp facilitating radial inward displacement of said finger during mounting of said sleeve in said wheel bearing bore.

17. The wheel assembly as defined in claim 16 wherein, said lug is formed with a tool surface thereon oriented for application of a radially inward force on said finger to move said wheel-engaging shoulder out of engagement with said wheel.

18. The wheel assembly as defined in claim 16 wherein, said wheel bearing bore is formed with an axially extending ramp therein positioned to cooperatively engage said ramp on said lug to effect radial inward displacement of said finger having said lug thereon during axial movement of said sleeve into said wheel bearing bore.

19. The wheel assembly as defined in claim 18 wherein, said wheel bearing bore is further formed with an axially extending alignment structure on a side of said bore opposite said ramp in said bore.

20. The wheel assembly as defined in claim 19 wherein, said body is formed with at least one axially extending outwardly projecting stiffening rib; and said alignment structure is provided by at least one notch dimensioned to and receiving said rib therein.

21. The wheel assembly as defined in claim 14 wherein, said wheel bearing bore is radially stepped along its length and the step in said bore provides said outwardly facing surface; and said sleeve assembly is radially stepped along its length, and the step in said sleeve provides said second wheel-engaging surface.

22. The wheel assembly as defined in claim 13 wherein, said sleeve is a monolithically formed plastic member and has a length dimension not extending substantially beyond either said inner side or said outer side of said wheel.

23. The wheel assembly as defined in claim 13, and an axial spacer member mounted on said axle proximate said wheel.

24. The wheel assembly as defined in claim 13, and said bore having a radially outwardly extending recess therein proximate an inner end of said bore; and said sleeve includes a radially outwardly extending rib proximate an inner end of said sleeve formed to seat in said recess.

25. The wheel assembly as defined in claim 24 wherein, said rib is annular and extends circumferentially around a majority of said inner end of said sleeve, and said rib is formed with an inwardly facing chamfer thereon to facilitate insertion of said sleeve into said bore.

* * * * *